(12) United States Patent
Byer et al.

(10) Patent No.: US 8,205,592 B2
(45) Date of Patent: Jun. 26, 2012

(54) NOISE ABATEMENT ENGINE COVER

(75) Inventors: Keith Byer, West Bloomfield, MI (US); Mark Arthurs, West Bloomfield, MI (US); John Bull, Orchard Lake, MI (US)

(73) Assignee: Eagle Industries, Inc., Wixom, MI (US)

( * ) Notice: Subject to any disclaimer, the term of this patent is extended or adjusted under 35 U.S.C. 154(b) by 0 days.

(21) Appl. No.: 12/646,667

(22) Filed: Dec. 23, 2009

(65) Prior Publication Data
US 2011/0146616 A1 Jun. 23, 2011

(51) Int. Cl.
*F02B 77/04* (2006.01)

(52) U.S. Cl. ................... 123/198 E; 123/198 D

(58) Field of Classification Search .................. 264/320, 264/241, 157, 299, 129, 136, 160, 137, 145, 264/40.4; 524/492, 589; 123/198 E, 41.7, 123/195 C, 400; *F02B 77/04*
See application file for complete search history.

(56) References Cited

U.S. PATENT DOCUMENTS

| | | | |
|---|---|---|---|
| 4,288,490 A | 9/1981 | Alfter et al. | |
| 4,584,232 A | 4/1986 | Frank et al. | |
| 4,863,791 A | 9/1989 | Steward et al. | |
| 6,471,557 B1 * | 10/2002 | Hattori | 440/88 R |
| 6,481,490 B1 * | 11/2002 | Vihtelic et al. | 164/516 |
| 6,875,066 B2 * | 4/2005 | Wolaver | 440/77 |
| 2007/0287001 A1 | 12/2007 | Carlson et al. | |

OTHER PUBLICATIONS 1.6L 16-Valve Aluminum Engine: Mini Cooper; Website: http://miniusa.com; build/configurator/mini_conv-m; Nov. 18, 2009; p. 1 of 1.
Baur Formschaumtechnik: Polyurethan, Formteile, Schaumstoff; Website: http://www.formschaum.de/en/sites/prod/kaltschaum.htm; Nov. 19, 2009; pp. 1 and 2.
Carcoustics Automotive Products; Website: http://www.carcoustics.com/tech-consult/automotive-products.html; Nov. 19, 2009.

* cited by examiner

*Primary Examiner* — Noah Kamen
*Assistant Examiner* — Keith Coleman
(74) *Attorney, Agent, or Firm* — Miller Canfield Paddock & Stone, P.L.C.; Timothy J. Enlgling

(57) ABSTRACT

An engine cover and method of making the same with a textured surface with an in-mold coating. A noise abatement cover for top of an engine has a textured, in-mold coated, high quality outer appearance with a core of medium density polyurethane. The method of making the cover includes applying a mold release to grained aluminum tool and applying coating to at least one side of the grained aluminum tool to form an in-mold coating on the resulting engine cover, which is preferably a single piece.

19 Claims, 2 Drawing Sheets

NOISE ABATEMENT ENGINE COVER

FIELD OF THE DISCLOSURE

This disclosure relates to a noise abatement cover used on top of an engine and method of making the same. More specifically, the noise abatement engine cover includes molded foam with a high quality outer surface appearance.

BACKGROUND

A variety of devices, using various materials and processes, provide noise abatement performance for automobiles: (1) plastic injection molded covers and those with added sound absorbers (2) fiberglass, (3) die-cut or molded (cast) foam and (4) high density foam.

Plastic injection molded covers provide aesthetic value, but typically do not provide sound absorption performance. Plastic injection molded covers can be fitted with sound absorbers (die-cut foam, molded (cast) foam, fiberglass), but this adds multiple parts in assembly and added expense.

Fiberglass provides level of sound absorption, but not high quality appearance. A commonly-used sound absorption material is specialized acoustic fiberglass.

Die-cut or molded (cast) foam provides a level of sound absorption, but not quality surface appearance. As noted, this can be used alone, but also in combination with other components.

The automotive industry uses foam material for noise abatement. Polyurethane foam is known for acoustical panels for sound barrier dampening and sound absorbsion. It reduces passenger compartment noise including in the engine compartment with polyurethane foam technology, including a sound absorption panel as a shaped component adapted to an engine compartment. Published Patent Application 2007/0287001 discloses a sound-absorbing compartment lining having a foam material layer and fiber layer made from mineral fibers. Another example for an automotive engine hood is as shown in U.S. Pat. No. 4,584,232. It discloses a sound absorbing member including a fiber grid insert disposed between and bonded to two open cell foam panels. Similarly, U.S. Pat. No. 4,288,490 discloses an engine hood lining for automotive vehicles having a continuous sheet-like body that is formed of a closed-cell polyethylene foam material and is shaped to fit the inside contour of a hood of the vehicle.

High density (i.e. 19 PCF) micro-cellular foam provides barrier/damper performance and good appearance, but not a high level of sound absorption performance.

Such a cover for the top of an engine is produced in Germany for the Mini Cooper, using high density, micro-cellular foam at approximately 15-19 PCF (240-300 kg/m$^3$), Carcoustics (of Germany) is a Tier-2 supplier of engine cover for the Mini Cooper. Baur Formschaumtechnik (of Mindelheim Germany) is the Tier-3 molder of part. High density foam does not provide a high level of sound absorption performance. As such, certain foam products are used in close association with the engine.

U.S. Pat. No. 4,863,791 discloses sound absorption in foam core panels including a method of manufacture of a foam core and vehicle trim panels made from such board. A foam board having a cell structure including a structure with large cells in a center portion is initially formed. This board is skived into two separate panels, each having one surface with relatively large cell structure and wherein said cells have been opened by the skiving process. This surface acts to promote enhanced sound absorption from the foam core board. This board may be laminated with appropriate decorative material and molded to make contoured resilient vehicle trim panels.

Current designs contain multiple parts or components for equivalent appearance and noise abatement performance.

SUMMARY

The present disclosure provides a molded foam part that provides improved appearance (beauty) and noise abatement. The engine cover provides both high quality sound absorption performance and high quality 1$^{st}$ surface appearance. The preferred single piece construction provides a first surface quality appearance, in-mold painted, textured, noise abatement cover used for the top of engine. The construction of the engine cover is different from the prior art in being an integral part with a unique combination of materials made by a certain process to obtain both quality appearance and noise abatement properties.

The type of materials used to obtain appearance and sound absorption characteristics are important. The preferred molded engine cover includes an in-mold paint coating with medium density polyurethane foam (i.e. 5-13 PCF density) to provide a show-quality surface appearance part with noise abatement properties. The engine cover has NVH (Noise, Vibration and Harshness) performance enhancements over existing engine covers. The construction, process, and materials all enhance NVH characteristics.

The process used to obtain appearance and sound absorption characteristics is important. The preferred method of making an engine cover includes:

applying, such as spraying, wax-based mold release to a grained aluminum tool, which is preferably temperature controlled;

applying coating, such as urethane-based paint, 0.0008-0.100" thick, to the grained aluminum tool, coated with mold release;

dispensing polyurethane foam into the grained aluminum tool;

allowing foam to expand in a tool cavity and cure; and extracting a part from the grained aluminum tool to function as an engine cover.

From the preferred process results a noise abatement cover used for top of an engine with a textured, in-mold coated, high quality outer appearance.

BRIEF DESCRIPTION OF THE DRAWINGS

The above-mentioned and other features of this disclosure and the manner of obtaining them will become more apparent, and the disclosure itself will be best understood by reference to the following descriptions of engine covers and methods taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following description or illustrated in the figures.

Figure 1:
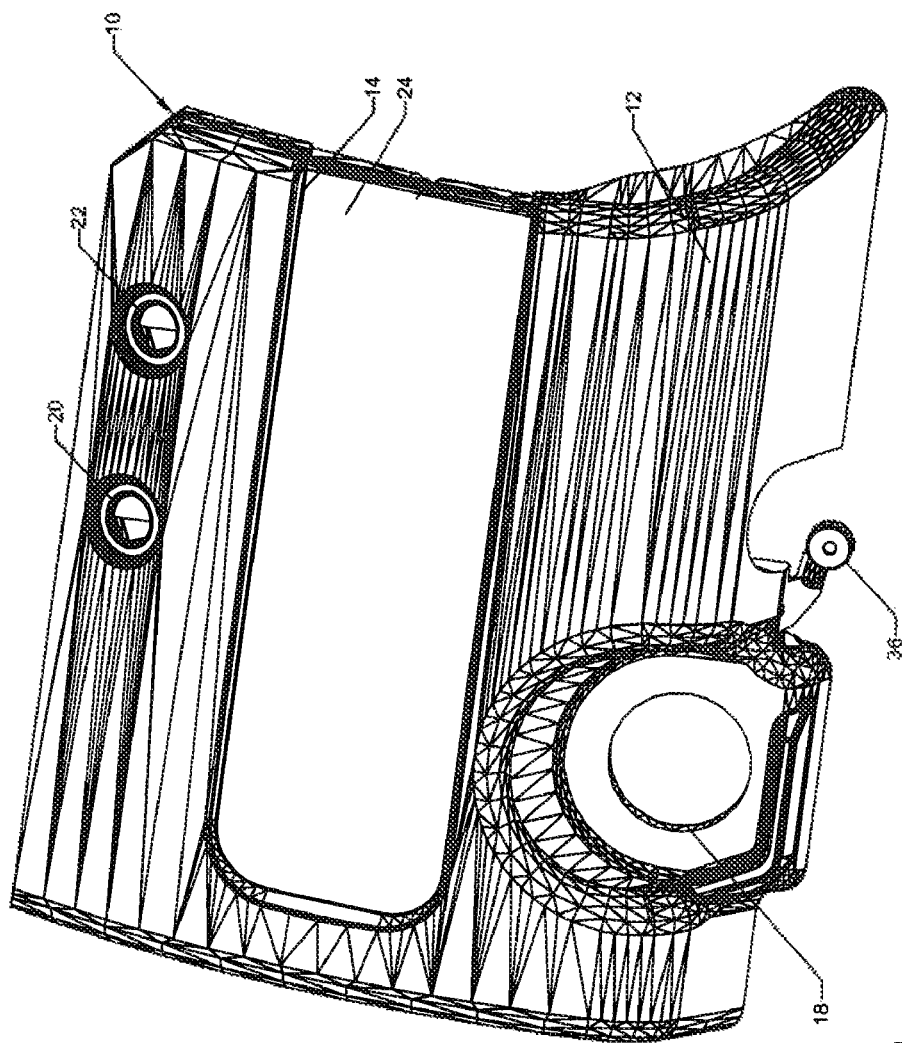
FIG. 1 shows a top view of a noise abatement engine cover.
Figure 2:
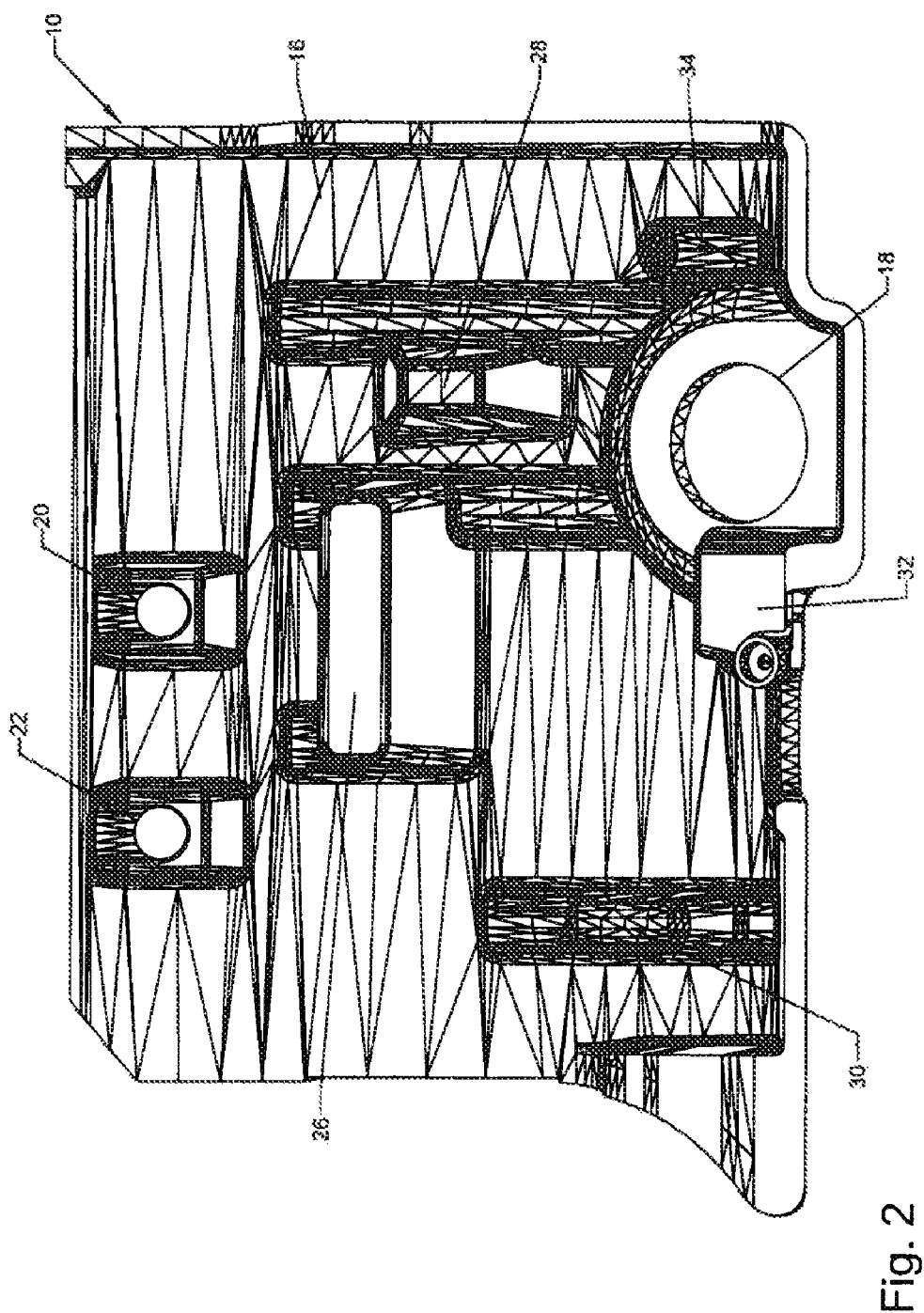
FIG. 2 shows a bottom view of an inner surface of the noise abatement engine cover.

As shown in FIG. 1, an engine cover 10 includes a textured outer surface 12 with an embedded coating 14 and an inner surface 16 that faces the engine. The engine cover 10 is preferably a single piece.

The outer surface 12 can receive its texture from grained aluminum tool that forms part of the cavity during the molding process. The coating 14 can be an in-mold coating, such as urethane-based paint that provides consistent color, gloss and UV protection.

The inner surface 16 may or may not have a coating. But preferably the inner surface 16 of the engine cover 10 does not have a coating. The inner surface 16 may be raw polyurethane.

The core of the engine cover 10 is medium density foam, such as polyurethane with a density of 5-13 PCF (80-208 kg/m$^3$). Due to engine heat, the preferred polyurethane core is high temperature polyurethane.

The engine cover 10 may have a series of apertures 18, 20 and 22 as clearance holes potentially to help secure the engine cover 10 to an engine. Attachment element 36 can be used as an attachment feature to secure the engine cover 10 to an engine. The engine cover 10 may have a depression 24 on a portion of the top outer surface 12 that is a pocket or recess for a name plate, label, logo or badge.

The inner surface 16 may protrusions 26, 28, 30, 32 and 34 on the bottom of the engine cover 10 to support the foam, so the outer surface 12 does not sag or warp. The protrusions 26, 28, 30, 32 and 34 extend from the inner surface 16 and are adapted to engage an engine upon with the engine cover 10 is attached.

The method of making the engine cover 10 with an appealing outer surface includes several steps. Preferably, the cavity within which the molded cover is formed is preferably a grained aluminum tool with a least one grained side to produce a textured surface of the engine cover 10. A mold release, such as a spray, wax-based compound, can initially be applied to the grained aluminum tool, on both the preferred grained side and a second side. After the grained aluminum tool is coated with mold release, a coating is applied, such as by spraying, to at least one side of the grained aluminum tool, primarily the grained side. The coating can be a urethane-based paint that can be applied 0.0008-0.100", with 0.001-0.0025" as a preferred thickness. Paint can form an in-mold, embedded coating 14 on the resulting engine cover 10 providing consistent color, gloss and UV protection. Another option for top coating is a urethane spray skin (0.7 mm to 7.5 mm). If no in-mold coating is applied on a second side of an aluminum tool that shapes the inner surface of the engine cover 10, that inner surface 16 of the resulting engine cover 10 will be uncoated raw foam.

Foam can be dispensed into a cavity of the grained aluminum tool to fill the cavity in the shape of the engine cover 10. The foam is allowed to expand in tool cavity and cure. The foam is preferably medium density polyurethane, such as high temperature polyurethane with a density of 5-13 PCF (80-208 kg/m$^3$).

The tool is opened and an engine cover 10 can be extracted having a textured outer surface 12 with an in-mold applied coating 14. A noise abatement engine cover 10 with a textured, in-mold coated, high quality outer appearance can result. The resulting engine cover 10 is preferably a single piece.

Emblems or labels can be attached to the engine cover 10, such as in depression 24, on a portion of the top outer surface 12.

Controlling temperature is desired for the grained aluminum tool before initially applying mold and during the expanding and curing of the foam.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

What is claimed is:

1. An exterior engine cover adapted to be used as an external cover of an engine comprising:
    a core of the exterior engine cover being medium density polyurethane; and
    a textured outer surface of the exterior engine cover with an embedded protective coating that is denser than the core wherein the outer surface exposed to the environment has a visible outer surface when installed.

2. The engine cover of claim 1 wherein the engine cover is a single piece with in-molded apertures and protrusions extending from an inner surface of the engine cover wherein areas between the apertures and protrusions are set back so as to not contact the engine being covered.

3. The engine cover of claim 1 wherein the protective coating is in-molded urethane-based paint that provides consistent color, gloss and UV protection on the outer surface.

4. The engine cover of claim 1 wherein the core is high temperature polyurethane with a density of 5-13 PCF and provides a high level of sound absorption in close association with the engine being covered.

5. The engine cover of claim 1 wherein an inner surface of the engine cover does not have a coating, wherein the inner surface faces the engine when the engine cover is installed.

6. The engine cover of claim 5 wherein the inner surface is raw polyurethane foam.

7. The engine cover of claim 5 having protrusions extending from the inner surface adapted to engage the engine being covered so the outer surface of the engine cover does not sag when installed on the engine.

8. The engine cover of claim 1 further comprising a series of molded apertures to help secure the engine cover to the engine.

9. A noise abatement engine cover for a land vehicle engine comprising:
    a core of the engine cover with a density of 5-13 PCF that provides a high level of sound absorption in close association with the engine being covered; and
    a textured outer surface with an embedded protective coating that provides consistent color and UV protection;
    wherein the engine cover is an integral piece adapted to externally cover a portion of the engine as an exterior component with the outer surface visible inside a vehicle engine compartment.

10. The noise abatement engine cover of claim 9 wherein an inner surface of the engine cover that is adjacent to the engine when installed does not have a coating and is raw polyurethane foam.

11. The engine cover of claim 9 further comprising a series of molded apertures through the engine cover adapted to secure the engine cover to the engine.

12. The engine cover of claim 10 having protrusions extending from the inner surface adapted to engage the engine being covered so the outer surface of the engine cover does not sag when installed on the engine.

13. A method of making a land vehicle engine cover with a textured outer surface including steps of:
   applying mold release to a tool having a grained side,
   applying coating to the grained side of the tool that is applied with mold release,
   dispensing foam of high temperature polyurethane with a density of 5-13 PCF into a cavity including the grained side of the tool, the cavity forming the shape of the engine cover,
   allowing foam to expand in the cavity and cure, and
   extracting from the tool the engine cover having the textured outer surface with the in-mold applied coating that provides protection as an outer surface of at least a portion of the engine cover.

14. The method of claim 13 wherein the coating is spray-applied urethane-based paint that provides consistent color, gloss and UV protection on the outer surface of the engine cover.

15. The method of claim 13 wherein the coating is 0.0008 to 0.0025 inch thick.

16. The method of claim 13 including the additional step of controlling temperature of the tool during expanding and curing of the foam.

17. The method of claim 13 wherein the engine cover is a single piece with in-molded apertures and protrusions extending from an inner surface of the engine cover wherein areas between the apertures and protrusions are set back so as to not contact the engine being covered.

18. The method of claim 13 where a second side of the tool is not applied with a coating.

19. The method of claim 18 wherein the grained side of the tool forms the textured outer surface on the engine cover and the second side forms an inner surface that is raw polyurethane foam.

* * * * *